W. T. MORRIS.
NUT LOCK.
APPLICATION FILED FEB. 25, 1916.
1,261,592.
Patented Apr. 2, 1918.
2 SHEETS—SHEET 1.
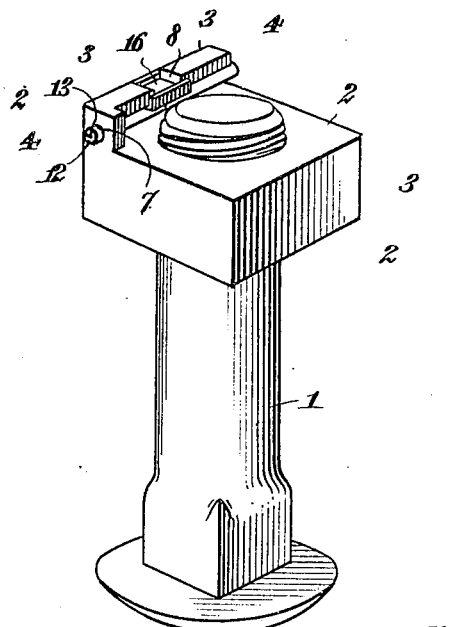
Fig. 1.
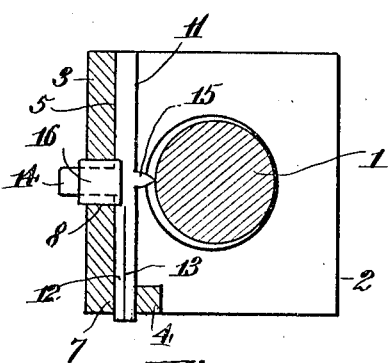
Fig. 2.
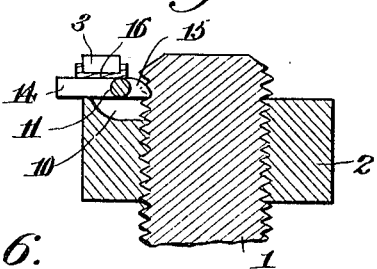
Fig. 3.
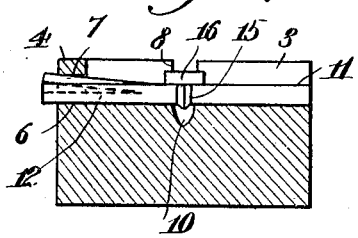
Fig. 4.
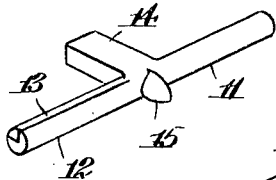
Fig. 5.
Fig. 6.
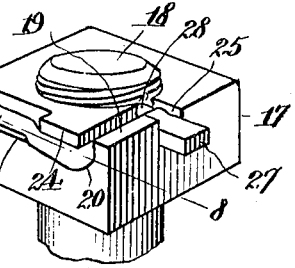
Fig. 7.
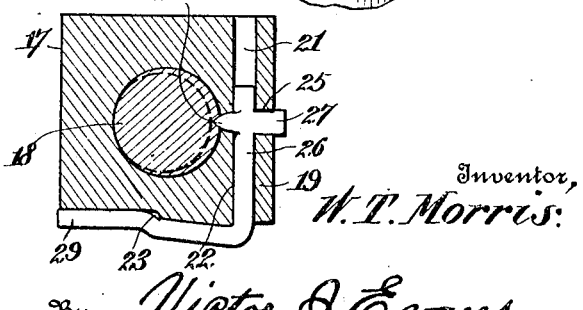
Fig. 8.
Witnesses:
C. Peinle Jr.
Wm. J. Hoerth
Inventor,
W. T. Morris
By Victor J. Evans,
Attorney.

W. T. MORRIS.
NUT LOCK.
APPLICATION FILED FEB. 25, 1916.
1,261,592.
Patented Apr. 2, 1918.
2 SHEETS—SHEET 2.
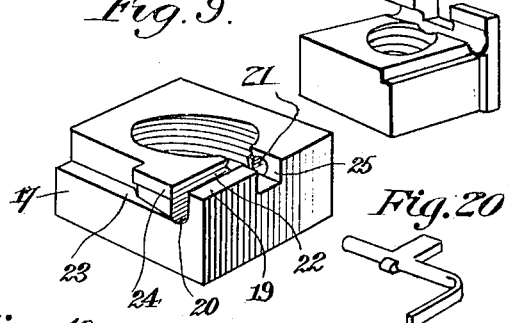
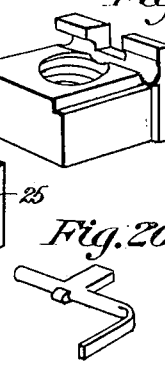
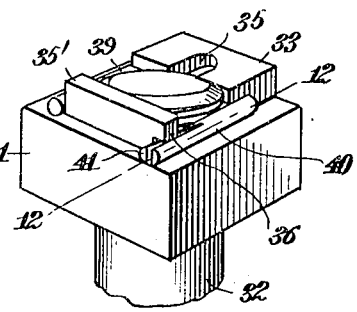
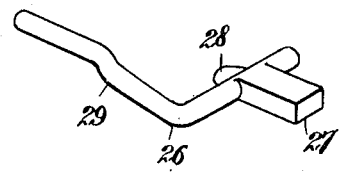
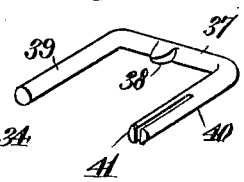
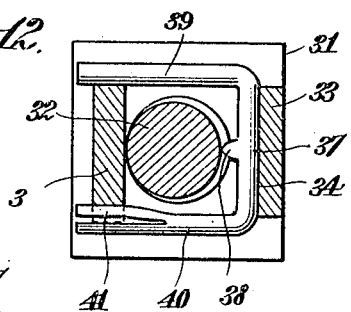
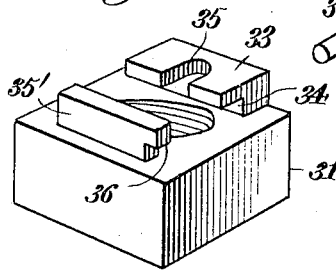
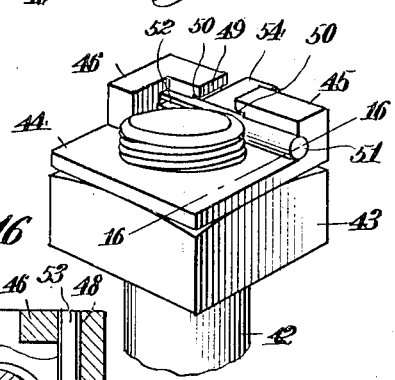
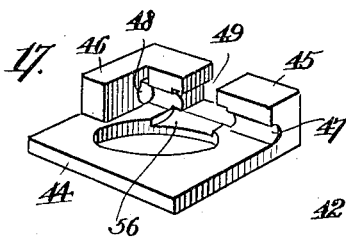
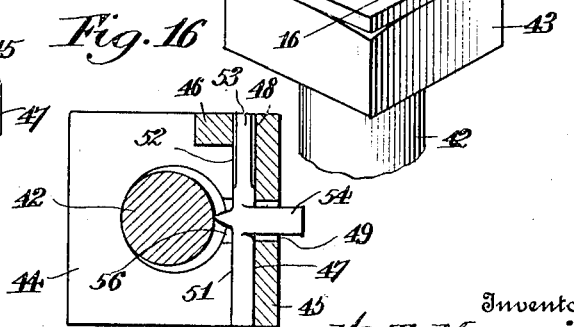
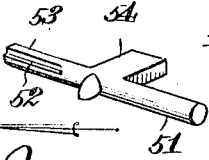
Inventor,
W. T. Morris.
Witnesses:
By Victor J. Evans,
Attorney.

UNITED STATES PATENT OFFICE.

WILLIAM T. MORRIS, OF WAXAHACHIE, TEXAS.

NUT-LOCK.

1,261,592.  Specification of Letters Patent.  Patented Apr. 2, 1918.

Application filed February 25, 1916. Serial No. 80,517.

*To all whom it may concern:*

Be it known that I, WILLIAM T. MORRIS, a citizen of the United States, residing at Waxahachie, in the county of Ellis and State of Texas, have invented new and useful Improvements in Nut-Locks, of which the following is a specification.

This invention relates to means for locking a nut upon a bolt, and an object of the same is to provide a nut or washer with a swinging hinged lock which may be removably secured to said nut or washer and which when swung in one direction is brought into contact with the threads of the bolt and locked upon the nut or washer in such position so as to effectively retain the nut locked to the bolt against danger of unscrewing from vibration or other accidental causes, the construction being such that the locking element may be readily brought out of engagement with the bolt to permit of the unscrewing of the nut or the removal of the washer, when desired.

Another object of the invention is to provide a nut lock which shall be of a simple construction, easily and quickly operated, cheap to manufacture and which will perform the functions for which it is designed with efficiency and with accuracy.

With the above and other objects in view, the improvement resides in the construction, combination and arrangement of parts set forth in the following specification and falling within the scope of the appended claims.

In the drawings:

Figure 1 is a view illustrating a nut locked upon a bolt in accordance with my invention, Fig. 2 is a sectional view approximately on the line 2—2 of Fig. 1, Fig. 3 is a sectional view approximately on the line 3—3 of Fig. 1, Fig. 4 is a sectional view on the line 4—4 of Fig. 1, Fig. 5 is a perspective view of the nut, the locking element being removed, Fig. 6 is a similar view of the locking member, Fig. 7 is a view of a modified form illustrating the nut in locked position upon the bolt, Fig. 8 is a sectional view approximately on the line 8—8 of Fig. 7, Fig. 9 is a perspective view of the nut, Fig. 10 is a perspective view of a lock removed from the nut, Fig. 11 is a view of a still further modified form of connecting the nut to a bolt, Fig. 12 is a sectional view approximately on the line 12—12 of Fig. 11, Fig. 13 is a perspective view of the nut, Fig. 14 is a perspective view of the lock, Fig. 15 is a view illustrating the application of a washer provided with my improvement showing the same contacting with the outer nut and engaging the threads of the bolt, Fig. 16 is a sectional view approximately on the line 16—16 of Fig. 15, Fig. 17 is a perspective view of the washer, Fig. 18 is a similar view of the lock, Fig. 19 is a perspective view of a still further modified form of the nut, and Fig. 20 is a perspective view of the lock member for the nut disclosed in Fig. 19.

Referring now to the drawings in detail, and to Figs. 1 to 6 thereof in particular, 1 designates the bolt upon which is screwed a nut 2. The nut has its body portion of the ordinary construction but is provided upon its outer face and at one of its edges with a flange 3 which is intersected by a right angular lug 4 arranged upon the edge of the lock which is disposed at an angle to the edge upon which the flange 3 is formed. The inner face of the flange is formed with a longitudinally extending rounded depression 5 which communicates with the round opening 6 provided by a substantially key-hole slot 7 formed in the lug 4. The flange 3 is approximately centrally formed with a transverse depression or opening 8 and one or both of the side walls provided by the said opening, at the outer surface of the flange is formed with an inturned rib 9. Also the face of the nut between the side walls provided by the opening 8 may be formed with a depression 10, and this depression communicates with the threaded bore of the nut 2.

The lock comprises a cross sectionally round bar of some hardened metal, such as harveyized or Krupp steel, and the same has one of its ends slitted longitudinally, as at 12, and provided upon one of its faces with a flat surface 13. This end of the bar 11 is adapted to be received within the key hole slot in the lug 4, while the body of the said bar is arranged within the depression 5 in the flange 3 and is adapted to frictionally contact with the wall provided by the said depression in a manner which will presently be described. The bar is approximately centrally formed with an arm 14, the same being in the nature of a lever whereby the bar may be rotated upon the nut. The bar, directly opposite and centrally of the lever 14 is formed with a pointed cutting member 15 which when the device is in operative position is adapted to be projected in the bore of the nut to engage the cut or threads of the bolt 1, or the said bolt 1 may have its threaded shank provided with a plurality of longitudinally extending grooves, any of which receiving the inwardly extending cutter member 15, when the lock is in locking position.

It will be apparent that the lock may be arranged upon the bolt and have its end journaled within the key hole slot in the lug 4 after the nut has been screwed home upon the bolt, the depression 2 receiving the cutting member 15 of the bar 11 after which the lever 14 may be swung under pressure to contact with the inner wall provided by the opening 8. When this is accomplished a wedge member is inserted in the slit 12 to bring the flat portion 13 of the bar within the substantially rectangular portion of the key hole slot, thus securing the lock upon the nut. As an additional securing means, a flat plate may be passed longitudinally over the lever 14 between the ribs 9, and the said plate, indicated by the numeral 16 may have its opposite ends bent over the opposite sides of the flange 3, as clearly illustrated in the showing of the drawings.

In Figs. 7 to 10 the nut 17 which is screwed upon the bolt 18 has its outer face channeled to provide one of its edges with a flange 19, the said flange extending approximately one-half of the width of the nut and having its inner end cut to provide an opening 20. The flange may have its inner face provided with a depression, and the portion of the nut opposite the flange and channel is formed with a round opening or passage 21 which communicates with the channel and with the depressed inner wall of the flange. The side of the nut to which the channel (indicated for distinction by the numeral 22) openings provided with a longitudinal depression 23 which terminates in a shoulder 24 that is provided by cutting away the nut in a line with the lower wall of the depression approximately central of the nut. The face of the nut at the inner wall provided by the opening 20 is formed with a slot or depression 25 which communicates with the bore of the nut, and it should be stated that the channel 22 also intersects the said bore of the nut.

The lock comprises a cross sectionally rounded bar 26 of a length to be snugly received within the channel 22 and within the opening or passage 21 of the nut. The bar is provided with an offset arm forming a lever 27 and arranged upon the face of the bar opposite the said lever is a sharpened outwardly extending cutting member 28 which is received in the slot 25 provided upon the face of the nut inwardly and centrally of the opening 20 when the lock is in its non-active position, but the said cutter member is adapted to be swung into engagement with the split threads of the bolt or to be received within a suitable depression in the threaded shank of the bolt 18 when the lever 27 is swung horizontally of the nut between the walls provided by the opening 20. The end of the bar 26, opposite that journaled in the opening 20 is provided with an angularly arranged curved spring finger 29 which is adapted, when the lock is in operative position to be received in the depression 23 of the nut and contact with the shoulder 24 to sustain the lock in proper position upon the nut. If desired, one or both of the side walls provided by the opening 20 may be formed upon their outer faces with ribs 30, and one of the edges of the lever may be moved beneath one of the said ribs to more securely sustain the lock upon the nut.

In Figs. 11 to 14 the nut 31 is screwed upon a bolt 32. The outer face of this nut at one of its edges is formed with a flange 33, and the inner wall of the said flange is provided with a longitudinal depression 34 which is round. The flange 33 has its outer surface provided with a central opening 35 which communicates with the depression 34, and the said face of the nut, directly opposite the flange 33 is formed with a lug 35, and the said lug has one of its ends provided upon its upper face with an extending rib 36. The lock member includes a bar 37 which is adapted to be arranged in the depression 34, the said bar having a laterally extending cutting element 38 which is adapted to be swung between the walls of the opening 35 when the lock is in a non-active position, but which is adapted to be swung over the bore of the nut and into contact with the threads of the bolt when the lock is in operative position. The bar 37 has its ends provided with parallel angularly extending arms 39 and 40, and the arm 40 is split or otherwise provided with a spring member 41 which is adapted to engage beneath the rib 36 at one of the ends of the lug 35 when the arms of the lock are swung to straddle the said lock, as clearly shown in the drawings.

In the remaining figures of the drawing I have illustrated a bolt 42 provided with a nut 33, both the nut and bolt being of the usual construction. Arranged upon the outer face of the nut is a washer 44, the said washer having its outer face provided with a flange 45 arranged at one of its ends and a lug 46 disposed at the corner of the nut forming an angular continuation of the flange 45. The flange is provided with a longitudinally extending curved depression 47, which communicates with a key hole opening 48 in the lug 46. The flange is approximately centrally provided with a cutaway portion or opening 47, and one or both of the transverse walls provided by the opening are formed with ribs 15 at the outer edges thereof.

The lock includes a bar 51 which is round in cross section and which has one of its ends split, as at 52, and one of the faces thereof flat, as at 53. The bar is provided approximately centrally thereof with an angular arm forming a lever 54, the said lever being swung between the walls provided by the opening 49 when the device is in operative position. The wall or surface of the washer 44 central and forward of the opening 49 is provided with a depression 56 to receive the cutter when the same is arranged flush with the inner straight wall of the flange 45 and is in its in-active position.

The flat end of the bar is inserted in the key hole opening 48 of the lug 46, and when the same is swung to active position, a suitable instrument is inserted within the slit so that this end of the bar sufficiently fills and contacts with the walls provided by the said key hole opening. This action also forces the bar longitudinally in one direction to bring one of the edges of the same into contact with one of the walls provided by the opening 49 and its face into engagement with one of the ribs 50 provided by the same.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

1. In a means for locking a nut on a bolt, a substantially square or rectangular element having a central opening receiving the shank of the bolt, said element being channeled from one of its sides in a line with its other side for approximately one-half of the length thereof, and the outer wall of the channel providing a flange, said flange having a transverse opening at the terminal of the channel, the side of the element from which the channel enters, having a depression, the inner wall of which being irregular, a locking bar comprising a substantially right angular member having one of its limbs received in the channel and the other limb received in the depression designed to frictionally engage with the inner wall provided by the said depression, the first mentioned limb being provided adjacent its ends with an outturned portion forming a lever designed to be received in the referred to opening in the flange and having its opposite face provided with a cutting member designed to enter the bore of the said square or rectangular member and to engage with the threads of the bolt.

2. In a device for the purpose set forth, the combination with a bolt and a nut screwed on said bolt, said nut, from one of its sides and upon its outer face being channeled longitudinally for approximately one-half the length of the nut, the outer wall of the channel providing a flange, and the said flange having an opening from the side of the nut, the nut having a passage arranged in a line with the inner wall of the channel, and also having an opening disposed opposite the first mentioned opening and communicating with the bore of the nut, the side of the nut from which the channel enters having a longitudinal depression, the inner wall of which being irregular, a shoulder upon the outer face of the nut overlying a portion of the depression, a locking bar received in the channel and in the passage, said bar having an offset portion received in the opening of the flange and having a cutting surface designed to enter the bore of the nut to engage with the threads of the bolt, said bar having an outer angular end received in the referred to depression in the nut, and frictionally contacting with the inner wall of the said depression, and underlying the referred to shoulder.

In testimony whereof I affix my signature in presence of two witnesses.

WILLIAM T. MORRIS.

Witnesses:
J. T. SPENCER,
W. A. McLAUGHLIN.